UNITED STATES PATENT OFFICE.

JUDSON J. CURTIS, OF HONESDALE, PENNSYLVANIA.

IMPROVEMENT IN PAINTS.

Specification forming part of Letters Patent No. 219,150, dated September 2, 1879; application filed January 21, 1879.

*To all whom it may concern:*

Be it known that I, JUDSON J. CURTIS, of Honesdale, in the county of Wayne and State of Pennsylvania, have invented a new and Improved Paint, of which the following is a specification.

My invention consists in a paint composed of oxide of zinc, raw linseed-oil, naphtha, rosin, sulphur, and shellac varnish in suitable proportions.

To enable others skilled in the art to make and use my invention, I will describe it more fully.

In order to produce the paint, I first take oxide of zinc and raw linseed-oil in about the proportion of thirty (30) pounds of the former to four (4) gallons of the latter, and thoroughly mix and grind them together. I then form shellac varnish by dissolving gum-shellac in alcohol in the proportion of three (3) ounces of the former to a half-pint of the latter. I then take rosin and "cut" or liquefy it with naphtha in about the proportion of one (1) pound of rosin to one (1) gallon of naphtha. I then take sulphur and raw linseed-oil in the proportion of two (2) ounces of the former to a half-pint of the latter and boil them to a liquid. As the quantities of alcohol and linseed-oil given above as solvents for the shellac and sulphur are not sufficient to form clear solutions of shellac and sulphur, the solutions may be made in barrels and allowed to settle before the clear liquid is drawn off. The shellac and sulphur remaining undissolved may have added to them fresh alcohol and linseed-oil in the proportions first stated. If clear solutions are desired without settling, solutions may be made in the proportion of one (1) pound of shellac to one (1) gallon of alcohol, and one-half ($\frac{1}{2}$) pound of sulphur to one (1) gallon of linseed-oil. Having prepared the ingredients, I take the above-named quantity of oxide of zinc and linseed-oil and rosin and naphtha, mix them together, and add about one (1) pint of the shellac varnish and about one-half ($\frac{1}{2}$) pint of the sulphur solution. I then mix the ingredients by stirring or otherwise, so as to thoroughly incorporate them in one homogeneous mass, adding sufficient linseed-oil to temper the paint to a proper consistence for use.

What I claim as my invention, and desire to secure by Letters Patent, is—

The paint composed of oxide of zinc, raw linseed-oil, naphtha, rosin, sulphur, and shellac varnish, in about the proportions specified.

JUDSON J. CURTIS.

Witnesses:
    WILLIAM H. DIMMICK,
    GEORGE E. BRAYTON.